US012704378B2

(12) United States Patent
Williams et al.

(10) Patent No.: US 12,704,378 B2
(45) Date of Patent: Aug. 11, 2026

(54) NAVIGATION SYSTEM FOR PROVIDING RECOMMENDED ROUTES BASED ON DRIVER SKILL LEVEL

(71) Applicant: STATE FARM MUTUAL AUTOMOBILE INSURANCE COMPANY, Bloomington, IL (US)

(72) Inventors: Aaron Williams, Congerville, IL (US); Joseph Robert Brannan, Bloomington, IL (US); John Donovan, Bloomington, IL (US); Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 432 days.

(21) Appl. No.: 17/889,973

(22) Filed: Aug. 17, 2022

(65) Prior Publication Data

US 2024/0003693 A1 Jan. 4, 2024

Related U.S. Application Data

(60) Provisional application No. 63/356,954, filed on Jun. 29, 2022.

(51) Int. Cl.
*G01C 21/34* (2006.01)
*G01C 21/36* (2006.01)

(52) U.S. Cl.
CPC ..... *G01C 21/3415* (2013.01); *G01C 21/3461* (2013.01); *G01C 21/3617* (2013.01); *G01C 21/3638* (2013.01); *G01C 21/365* (2013.01); *G01C 21/3697* (2013.01)

(58) Field of Classification Search
CPC ............ G01C 21/3415; G01C 21/3461; G01C 21/3617; G01C 21/3638; G01C 21/365
See application file for complete search history.

(56) References Cited

U.S. PATENT DOCUMENTS

| | | | |
|---|---|---|---|
| 5,177,685 | A | 1/1993 | Davis et al. |
| 9,127,955 | B2 | 9/2015 | Tsimhoni et al. |
| 9,146,127 | B2 | 9/2015 | Bank et al. |
| 9,189,959 | B2 | 11/2015 | Bank et al. |
| 9,830,748 | B2 | 11/2017 | Rosenbaum |
| 9,990,782 | B2 | 6/2018 | Rosenbaum |
| 10,037,689 | B2 | 7/2018 | Taylor |
| 10,269,190 | B2 | 4/2019 | Rosenbaum |

(Continued)

FOREIGN PATENT DOCUMENTS

| | | | |
|---|---|---|---|
| EP | 3239686 | A1 | 11/2017 |
| EP | 3578433 | B1 | 8/2020 |

(Continued)

*Primary Examiner* — Charles J Han
(74) *Attorney, Agent, or Firm* — MARSHALL, GERSTEIN & BORUN LLP; Randall G. Rueth

(57) ABSTRACT

The present systems and method relate generally to adjusting navigation directions. In some embodiments, one or more processors obtain a driving score based upon a user's driving history traversing streets displayed in virtual reality (VR). A request for navigation directions may then be received, and a set of navigation directions may be generated in response to the request. The generated set of navigation directions may be adjusted based upon the driving score.

20 Claims, 7 Drawing Sheets

(56) References Cited

U.S. PATENT DOCUMENTS

| | | | | |
|---|---|---|---|---|
| 10,467,824 | B2 | 11/2019 | Rosenbaum | |
| 11,227,452 | B2 | 1/2022 | Rosenbaum | |
| 11,407,410 | B2 | 8/2022 | Rosenbaum | |
| 11,524,707 | B2 | 12/2022 | Rosenbaum | |
| 11,594,083 | B1 | 2/2023 | Rosenbaum | |
| 2005/0256635 | A1 | 11/2005 | Gardner et al. | |
| 2008/0100476 | A1 | 5/2008 | Kim | |
| 2009/0024273 | A1 | 1/2009 | Follmer et al. | |
| 2009/0157294 | A1 | 6/2009 | Geelen et al. | |
| 2012/0191343 | A1 | 7/2012 | Haleem | |
| 2014/0005923 | A1* | 1/2014 | Bank | G01C 21/3617<br>701/424 |
| 2021/0364311 | A1* | 11/2021 | Baig | G06F 16/9537 |
| 2022/0024485 | A1* | 1/2022 | Theverapperuma | G06V 20/58 |
| 2022/0051589 | A1* | 2/2022 | Madison | G09B 9/048 |
| 2022/0092893 | A1 | 3/2022 | Rosenbaum | |
| 2022/0340148 | A1 | 10/2022 | Rosenbaum | |
| 2023/0060300 | A1 | 3/2023 | Rosenbaum | |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |

* cited by examiner

NAVIGATION SYSTEM FOR PROVIDING RECOMMENDED ROUTES BASED ON DRIVER SKILL LEVEL

CROSS REFERENCE TO RELATED APPLICATIONS

This application claims the benefit of U.S. Provisional Application No. 63/356,954, entitled "Navigation System for Providing Recommended Routes Based on Driver Skill Level" (filed Jun. 29, 2022), the entirety of which is incorporated by reference herein.

FIELD

The present disclosure generally relates to adjusting navigation directions. More particularly, the present disclosure relates to adjusting navigation directions according to a driving score for a user based upon the user's driving history traversing streets displayed in virtual reality (VR).

BACKGROUND

In some scenarios, particular portions of a route may exceed a driver's skill level. This may be because the particular portion of the route is generally very difficult, or because of a particular condition of the portion of the route (e.g., it is raining on the portion of the route, and the driver is unskilled at driving during rain).

The systems and methods disclosed herein provide solutions to these problems and may provide solutions to other drawbacks of conventional techniques.

SUMMARY

The present embodiments relate to, inter alia, a navigation system for providing recommended routes based upon driver skill level. In certain embodiments, a driver may receive a grade based upon the abilities of the driver navigating through AR/VR (Augmented Reality/Virtual Reality) streets (or streets in the metaverse), or on physical roads where the driver's performance is graded based on sensor data from the vehicle. Then when the driver enters a destination in a navigation system, the driver may be informed if it would be considered safe based upon their driving experience and skill level.

Furthermore, the navigation system may navigate the driver away from areas that could cause them problems, or the driver may receive an audible warning when reaching a difficult location to drive. This could be for general locations (e.g., all of Washington D.C., downtown Boston) or specific locations (e.g., a particular right turn is tricky because there is not enough room for long trailers. If so, the navigation system may recommend going straight for half a mile, and then turning at another street because it is an easier turn).

In one aspect, a computer-implemented method for improved vehicle navigation based upon virtual reality (VR) or augmented reality (AR) training may be provided. The method may be implemented via one or more local or remote processors, servers, sensors, transceivers, virtual headsets (such as AR, VR, or XR (eXtended Reality) headsets), and/or other electronic or electrical components. In one instance, the method may include: (1) obtaining, via one or more processors, a driving score for a user based upon the user's driving history traversing streets displayed in VR; (2) receiving, by the one or more processors, a request for navigation directions to a destination; (3) generating, by the one or more processors, a set of navigation directions in response to the request, including adjusting the set of navigation directions based upon the driving score for the user; and/or (4) providing, by the one or more processors, the adjusted set of navigation directions to the user. The method may include additional, fewer, or alternate actions, including those discussed elsewhere herein.

In another aspect, a computer system configured for improved vehicle navigation based upon virtual reality (VR) or augmented reality (AR) training may be provided. The computer system may comprise one or more local or remote processors, transceivers, servers, virtual headsets, and/or sensors configured to: (1) obtain a driving score for a user based upon the user's driving history traversing streets displayed in VR; (2) receive a request for navigation directions to a destination; (3) generate a set of navigation directions in response to the request, including adjusting the set of navigation directions based upon the driving score for the user; and/or (4) provide the adjusted set of navigation directions to the user. The computer system may include additional, less, or alternate functionality, including that discussed elsewhere herein.

In yet another aspect, a computer device for improved vehicle navigation based upon virtual reality (VR) or augmented reality (AR) training may be provided. The computer device may comprise: one or more processors; and one or more memories coupled to the one or more processors. The one or more memories including computer executable instructions stored therein that, when executed by the one or more processors, may cause the one or more processors to: (1) obtain a driving score for a user based upon the user's driving history traversing streets displayed in VR; (2) receive a request for navigation directions to a destination; (3) generate a set of navigation directions in response to the request, including adjusting the set of navigation directions based upon the driving score for the user; and/or (4) provide the adjusted set of navigation directions to the user. The computer device may include additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Figure 1:
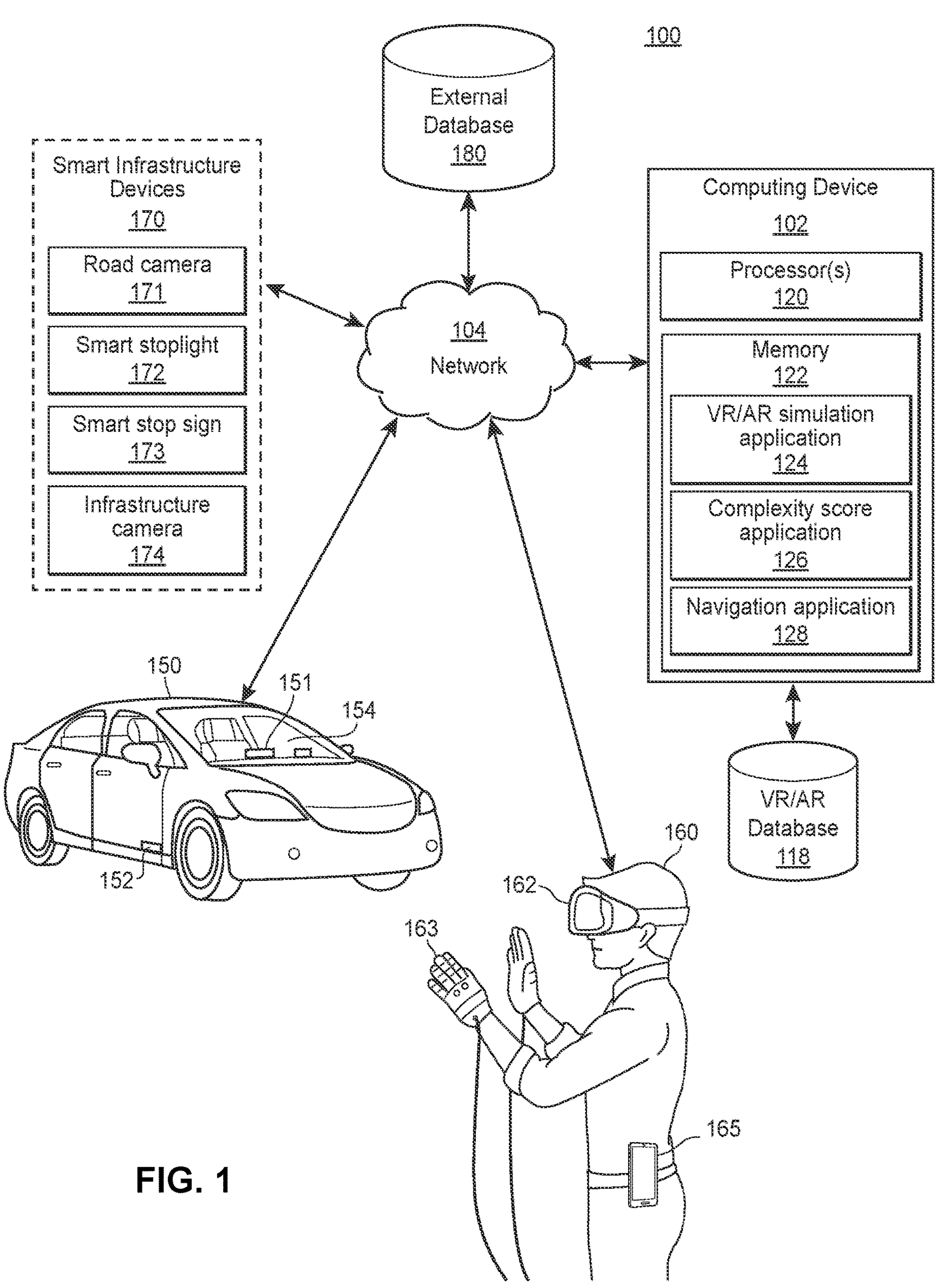
FIG. 1 illustrates an exemplary system for improved vehicle navigation based upon virtual reality (VR) or augmented reality (AR) training.

While the systems and methods disclosed herein is susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples. Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

The present disclosure generally relates to, inter alia, adjusting navigation directions. More particularly, the present disclosure relates to adjusting navigation directions according to a driving score for a user based upon the user's driving history traversing streets displayed in virtual reality (VR).

Some embodiments disclosed herein advantageously adjust navigation directions to improve them. For example, a user (e.g., a driver, etc.) may request navigation directions to a destination. In determining the navigation directions, however, it may be discovered that certain segment(s) of a route are particularly complex. In this situation, it may be unadvisable for the user to traverse these particular segment (s) (e.g., the complexity of the segment(s) exceed the user's skill level). Thus, it may be advisable, for example, to replace a particular segment of the route with a detour segment of the route that is better suited for the user's skill level.

Further regarding this example, it may be difficult to determine what a user's skill level is, and if there are any particular conditions that the user is especially skilled or unskilled at driving in. As such, in some embodiments, a VR system is used to obtain a driving score for the user to thereby improve the adjustment to the navigation directions.

Exemplary System for Improved Vehicle Navigation Based Upon Virtual Reality (VR) or Augmented Reality (AR) Training To this end, FIG. 1 shows an example system 100 for improved vehicle navigation based upon virtual reality (VR) or augmented reality (AR) training (e.g., a VR or AR simulation). The high-level architecture includes both hardware and software applications, as well as various data communications channels for communicating data between the various hardware and software components.

Broadly speaking, the computing device 102 may provide improved navigation directions to a user 160. To accomplish this, in some embodiments, the computing device 102 may initially provide a VR or AR driving simulation (e.g., VR or AR training) to the user 160, and create a driving history for the user 160 based upon the simulation. The driving history may then be used to determine the driving score for the user 160. Subsequently, the user 160 may request navigation directions from the computing device 102, and the computing device 102 may generate the navigation directions based upon the driving score. For example, using the driving score, the computing device 102 may determine if various segments of a route are too complex for the driver (e.g., by generating complexity scores for the various segments of the route).

The computing device 102 may include one or more processors 120 such as one or more microprocessors, controllers, and/or any other suitable type of processor. The computing device 102 may further include a memory 122 (e.g., volatile memory, non-volatile memory) accessible by the one or more processors 120 (e.g., via a memory controller).

The one or more processors 120 may interact with the memory 122 to obtain, for example, computer-readable instructions stored in the memory 122. Additionally or alternatively, computer-readable instructions may be stored on one or more removable media (e.g., a compact disc, a digital versatile disc, removable flash memory, etc.) that may be coupled to the computing device 102 to provide access to the computer-readable instructions stored thereon. In particular, the computer-readable instructions stored on the memory 122 may include instructions for executing various applications, such as a VR/AR simulation application 124, a complexity score application 126, and/or a navigation application 128.

In some examples, the VR/AR simulation application 124 may generate a VR or AR feed allowing the user 160 to traverse streets displayed in VR or AR, and thereby allowing for creation of a driving history of the user 160. The user may experience the VR or AR feed on a VR or AR display (e.g., VR goggles 162 or smart windshield 154). The user 160 may traverse the streets (displayed in VR or AR) by any suitable technique. For example, the user may use the VR gloves 163 to traverse the streets.

In another example, where the AR or VR display is the smart windshield 154, the user 160 may use the controls of the vehicle 150 to traverse the streets. For instance, if the vehicle 150 is not traveling, or is travelling in a fully autonomous mode, the controls of the vehicle 150 (e.g., the steering wheel, the accelerator pedal, etc.) may be used to traverse the streets displayed in VR or AR. In yet another example, the user 160 may use her smartphone 165 to traverse the streets.

The generated user's driving history may be stored in the memory 122 and/or the AR/VR database 118. The memory 122 and/or the AR/VR database 118 may store any other kind of data as well. For example, the memory 122 and/or the AR/VR database 118 may store: the driving score, the VR or AR feeds, any data generated by the vehicle 150, any data generated by a smart infrastructure device 170, etc.

The complexity score application 126 may generate a complexity score of a route, or of segments (e.g., portions)

of the route. As will be described elsewhere herein, the complexity score(s) may be used to adjust the navigation directions.

The navigation application 128 may be used to generate and/or adjust navigation directions, as will be described elsewhere herein.

The vehicle 150 may be an autonomous vehicle (e.g., a vehicle capable of driving autonomously, semi-autonomously, or in a manual mode, etc.). In this regard, the vehicle 150 may have autonomous operation features that may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation.

In addition to information regarding the position or movement of a vehicle, autonomous operation features may collect and utilize other information, such as data about other vehicles or control decisions of the vehicle. Such additional information may be used to improve vehicle operation, route the vehicle to a destination, warn of component malfunctions, advise others of potential hazards, or for other purposes described herein. Information may be collected, assessed, and/or shared via applications installed and executing on computing devices associated with various vehicles or vehicle operators, such as on-board computers of vehicles or smartphones of vehicle operators. By using computer applications to obtain data, the additional information generated by autonomous vehicles or features may be used to assess the autonomous features themselves while in operation or to provide pertinent information to non-autonomous vehicles through an electronic communication network 104 (which may be a wired and/or wireless network, such as the internet). These and other advantages are further described below.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

In some embodiments, information regarding the risks associated with vehicle operation with and without the autonomous operation features may be used to determine risk categories or premiums for a vehicle insurance policy covering a vehicle with autonomous operation features, as described elsewhere herein. Risk category or price may be determined based upon factors relating to the evaluated effectiveness of the autonomous vehicle features. The risk or price determination may also include traditional factors, such as location, vehicle type, and level of vehicle use.

The vehicle 150 may have various vehicle sensors 152. The vehicle sensors 152 may be any kind of sensors. Examples of the vehicle sensors 152 include: cameras (e.g., for capturing images and/or video), light detection and ranging (LIDAR) cameras, radio detection and ranging (RADAR) devices, accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, audio or video recorders, etc. Additional examples vehicle sensors 152 include advanced sensors, for example, that detect and/or receive data associated with temperature measurements, thermal imaging, weather conditions, traffic conditions, etc. The vehicle 150 may include any number or combination of vehicle sensors 152.

The vehicle 150 may further include one or more processors 151, such as one or more microprocessors, controllers, and/or any other suitable type of processor. The one or more processors 151 may perform any functions. For example, the one or more processors 151 may control the vehicle 151 while it is driving in an autonomous or semi-autonomous mode. In another example, the one or more processors 151 may switch the vehicle 150 between manual, autonomous, and semi-autonomous modes. As will be discussed further below, the one or more processors 151 may perform any of the functions of the VR/AR simulation application 124, the complexity score application 126, and/or the navigation application 128.

The vehicle 150 may be in communication with smart infrastructure devices 170. Examples of the smart infrastructure devices 170 include road camera 171, smart stoplight 172, smart stop sign 173, and infrastructure camera 174. Any of the smart infrastructure devices 170 may include any kind of sensors. For example, any of the smart infrastructure devices 170 may include: cameras (e.g., for capturing images and/or video), light detection and ranging (LIDAR) cameras, radio detection and ranging (RADAR) devices, accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, audio or video recorders, thermal imaging devices, etc. Furthermore, any of the smart infrastructure devices 170 may include multiple sensors (e.g., any combination of the example sensors just listed).

The example system 100 may also include external database 180. The external database 180 may hold any suitable data. Examples of the data held by external database 180 include historical image data (e.g., generated by the smart infrastructure devices 170), historical video data (e.g., generated by the smart infrastructure devices 170), historical VR and/or AR data, driving scores, complexity scores, etc.

Exemplary VR/AR Simulations to Determine Driving Scores

As mentioned above, in some embodiments, the computing device 102 (e.g., via the VR/AR simulation application)

generates VR or AR simulations to allow the user 160 to traverse the AR or VR streets to generate a driving history of the user 160. Furthermore, as will be explained elsewhere herein, the VR or AR simulation may also include weather or road conditions (e.g., rain, snow, narrow streets, steep inclines and/or declines, etc.), which may be used to generate categorical scores included in the driving score.

Figure 2:
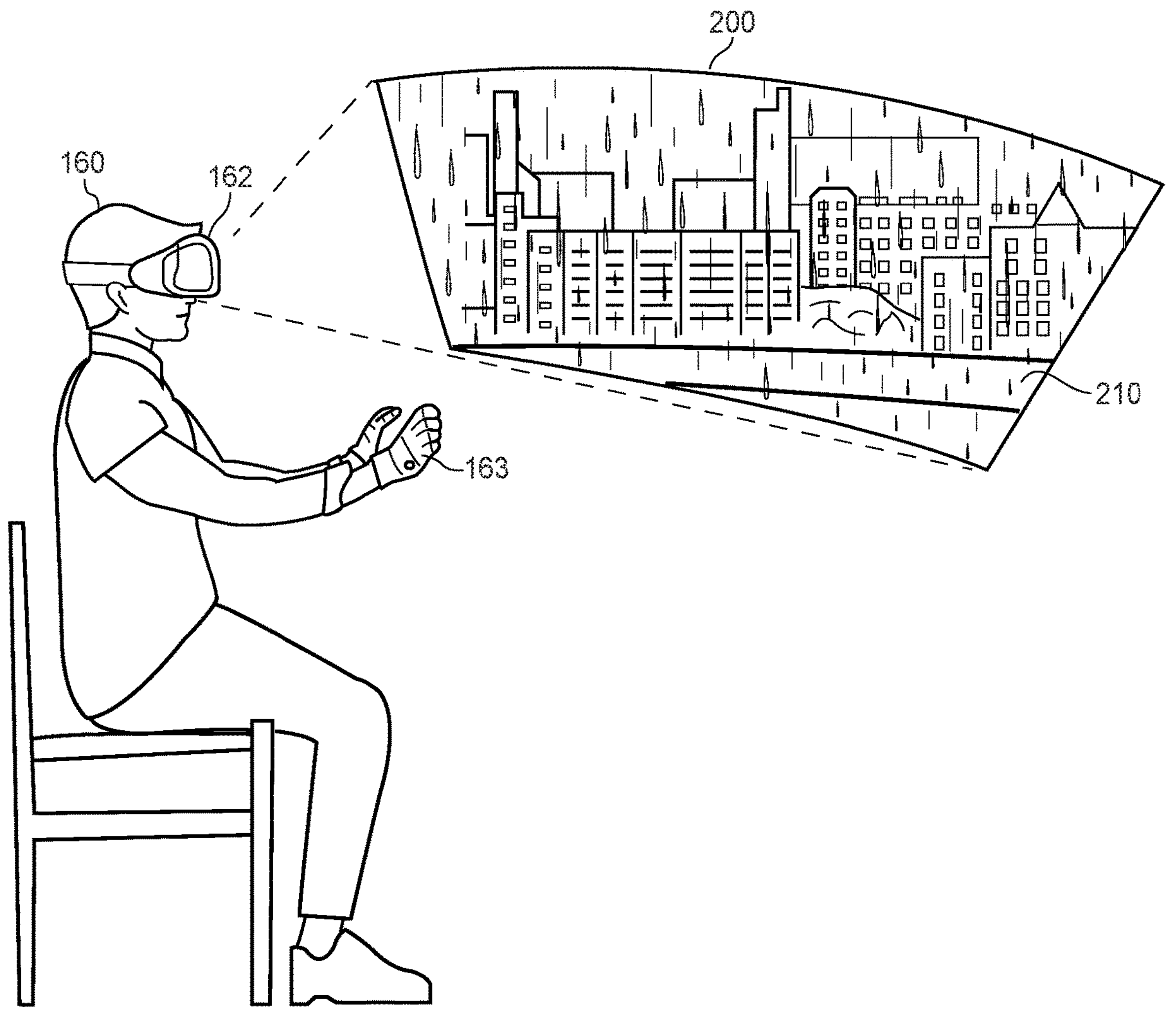
FIG. 2 shows an exemplary VR display, including a VR simulation of driving with a rain condition.

FIG. 2 shows an exemplary VR display 200, including a VR simulation of driving with a rain condition. More specifically, the user 160 is wearing the VR goggles 162, and is using the VR gloves 163 to traverse street 210 in the VR simulation with a rain condition.

Figure 3:
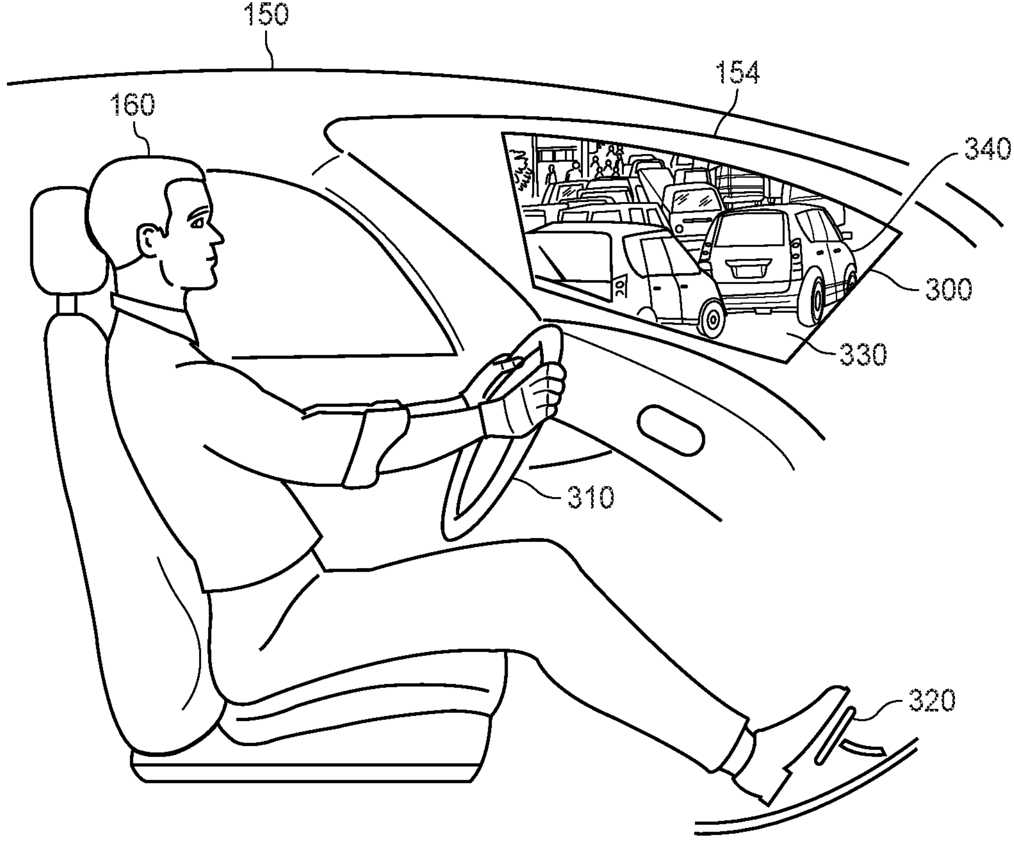
FIG. 3 shows an exemplary VR display, including a VR simulation of driving through dense traffic.

FIG. 3 shows an exemplary VR display 300, including a VR simulation of driving through dense traffic. In this example, the user 160 is inside of the vehicle 150, and is viewing the VR simulation on the smart windshield 154. The user 160 is using the steering wheel 310 and the accelerator pedal 320 of the vehicle 150 to drive through the street 330 (e.g., the vehicle 150 may be stationary, or in an autonomous mode of operation, etc.). There is also heavy traffic on the street 330 caused by other vehicles 340.

Figure 4:
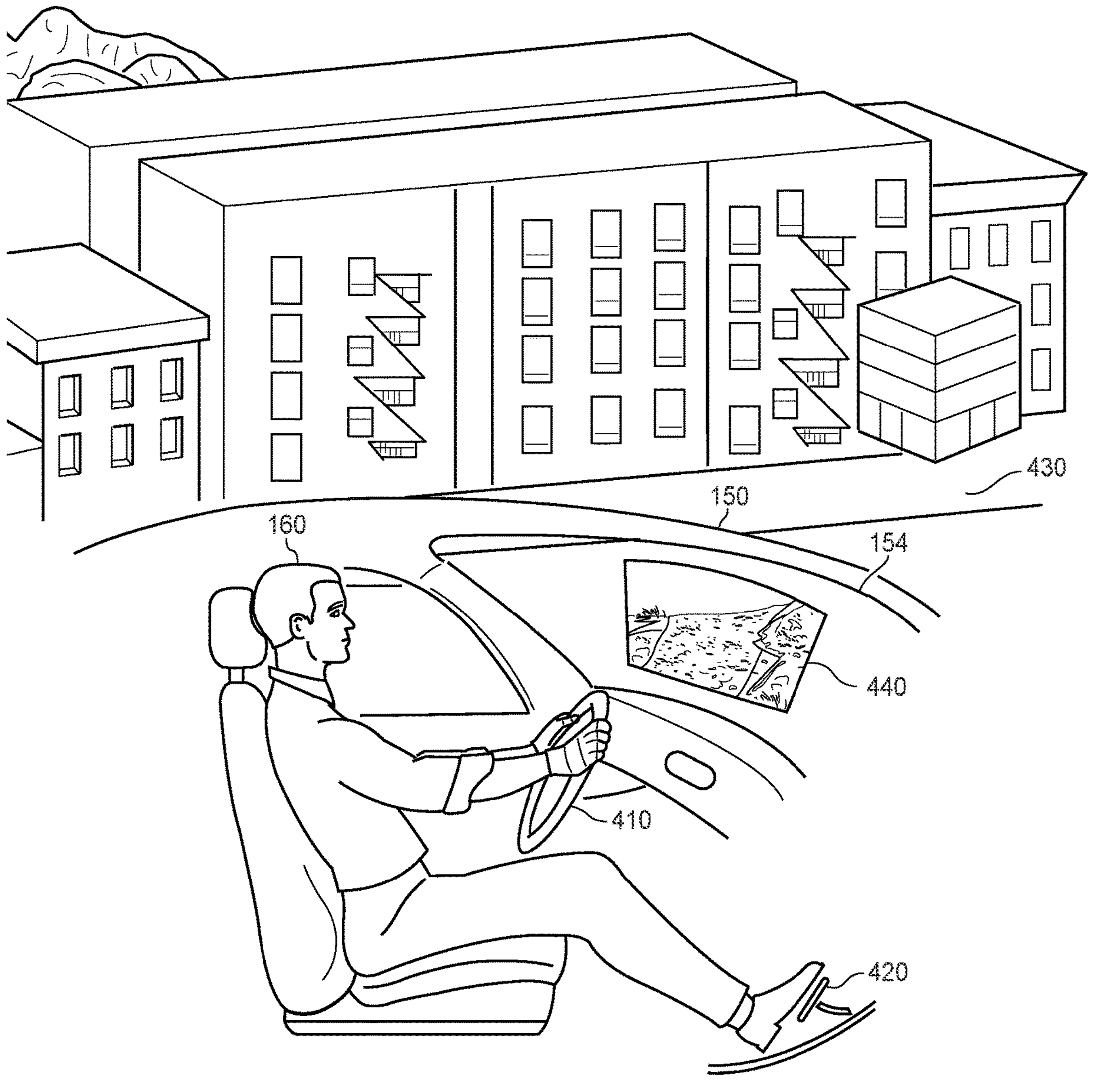
FIG. 4 shows an exemplary AR display, including an AR simulation of driving on a dirt road.

FIG. 4 shows an exemplary AR display 400, including an AR simulation of driving on a dirt road 440. In this example, the user 160 is looking through the smart windshield 154. The user 160 is using the steering wheel 410 and the accelerator pedal 420 of the vehicle 150 to drive through the street 430 and simultaneously through the AR simulation. Further, regarding the created AR simulation, outside of the actual vehicle 150 is the street 430; and, to create the AR simulation, dirt road imagery is overlaid on the smart windshield 154 to illustrate the dirt road 440 on the AR display 400.

Exemplary Adjustments of the Navigation Directions

As further mentioned above, to improve the navigation directions, the computing device 102 (e.g., via the navigation application 128) adjusts the navigation directions based upon the driving score. In some embodiments, the adjustment to the navigation directions includes one or both of changing a route of the navigation directions, and/or sending a warning to the user (e.g., a warning to avoid a certain segment of the route).

Figure 5:
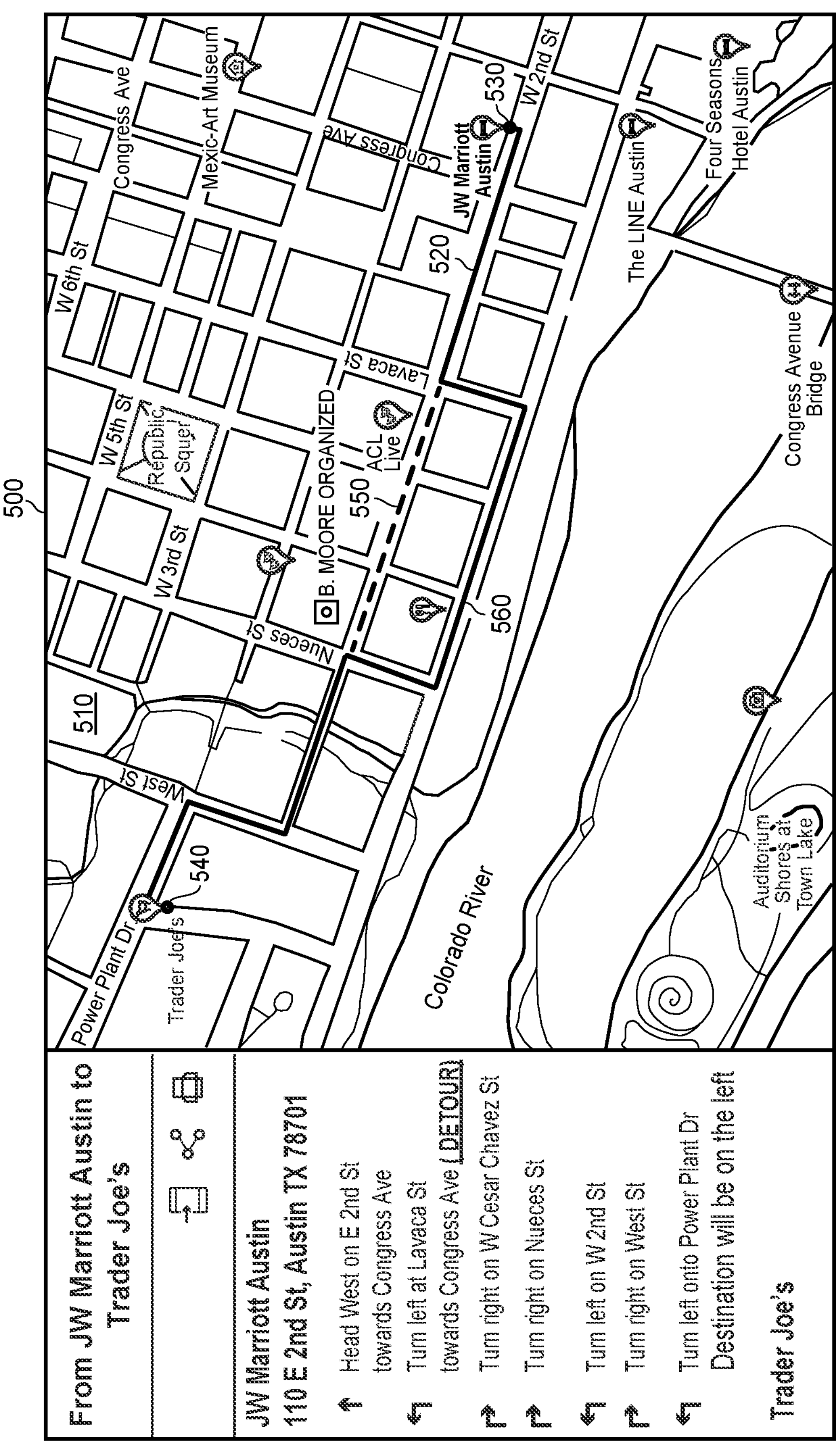
FIG. 5 illustrates an example of an adjustment to a set of navigation directions including changing a route of the navigation directions.

FIG. 5 illustrates an example of an adjustment including changing a route of the navigation directions. In particular, FIG. 5 illustrates a display 500 (e.g., displayed on smartphone 165, etc.) with a map 510 with navigation directions including a route 520 from a start location 530 to a destination 540. In this example, an original portion 550 of the route 520 has been replaced with a detour portion 560 of the route. For instance, the original portion 550 may have been replaced with the detour portion 560 because of their respective complexity scores and/or the user's 160 driving score (s).

Figure 6:
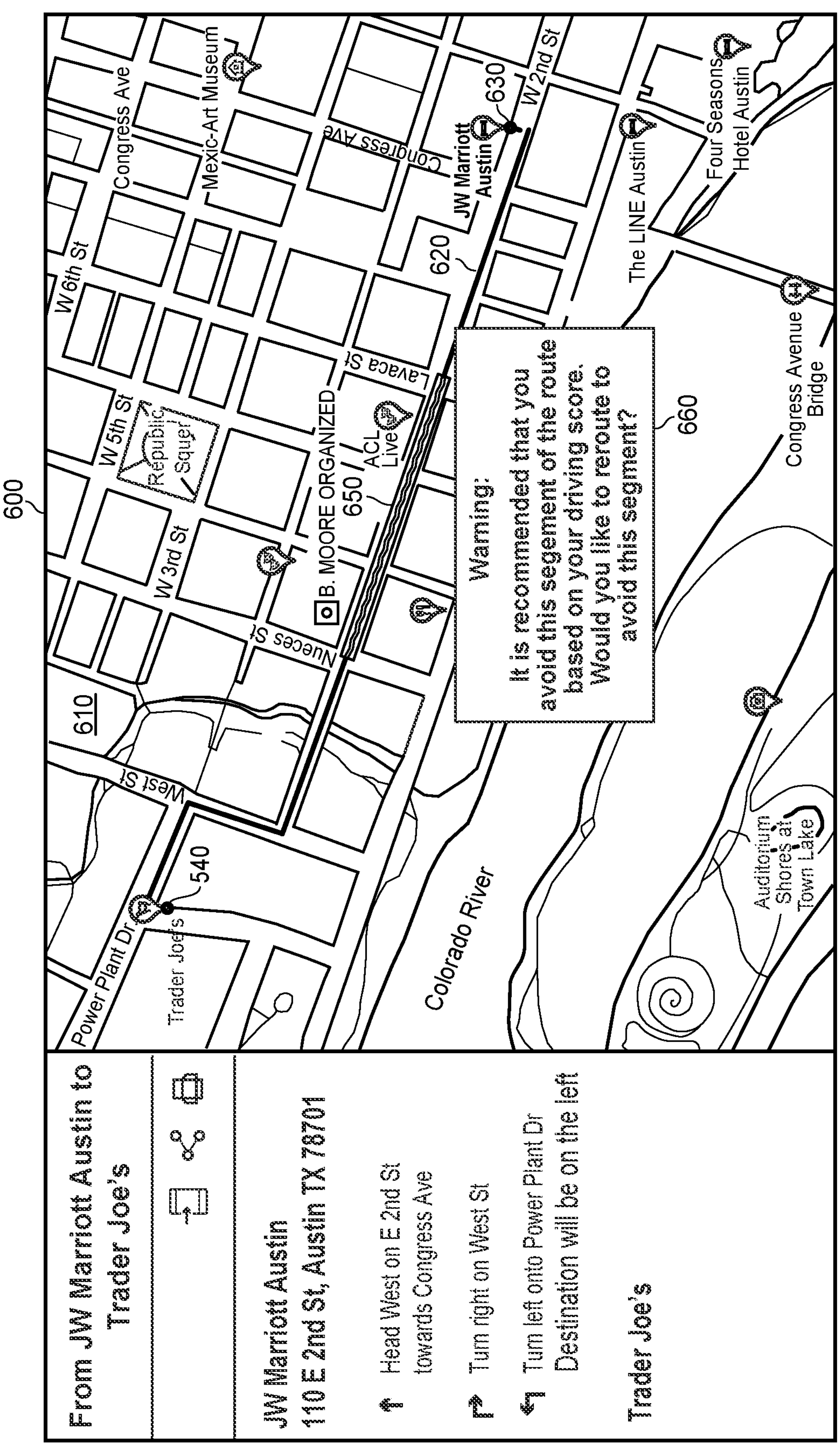
FIG. 6 illustrates an example of an adjustment to a set of navigation directions including a warning to the driver.

FIG. 6 illustrates an example of the adjustment including a warning to the driver. More specifically, this example shows a display 600 (e.g., displayed on smartphone 165, etc.) with a map 610 with navigation directions including a route 620 from a start location 630 to a destination 640. A segment 650 (e.g., portion) of the route 620 has a warning 660 that says, "Warning: It is recommended that you avoid this segment of the route based on your driving score. Would you like to reroute to avoid this segment?"

Figure 7:
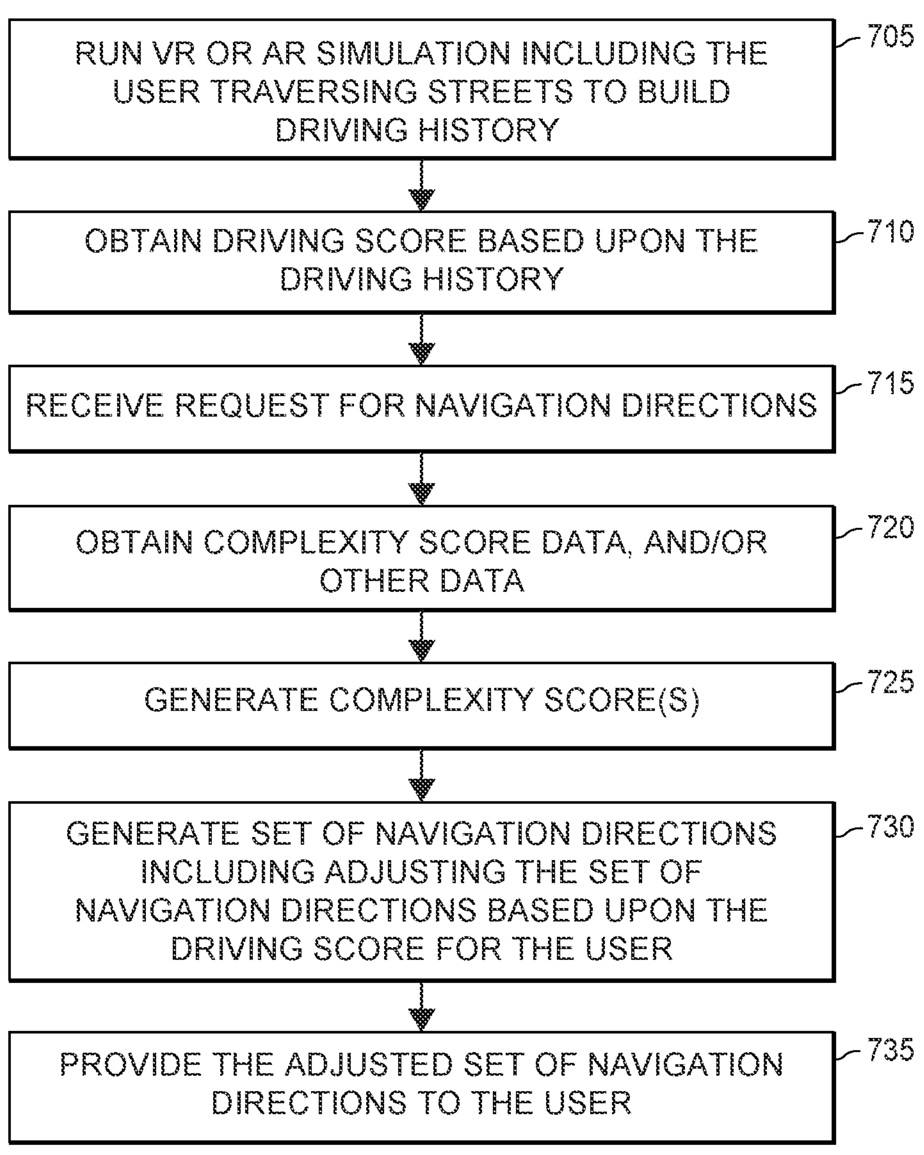
FIG. 7 shows an exemplary flow diagram of an exemplary computer-implemented method for providing improved vehicle navigation.

Exemplary Methods for Improving Vehicle Navigation Based Upon Virtual Reality (VR) or Augmented Reality (AR) Training FIG. 7 shows an exemplary implementation or computer-implemented method 700 of providing improved vehicle navigation. Although the following discussion refers to many of the blocks of the exemplary implementation 700 as being performed by the one or more processors 120, it should be understood that any of the blocks or functions of the example implantation 700 may be performed by either of the one or more processors 120 of the computing device 102, or the one or more processors 151 of the vehicle 150.

The exemplary implementation 700 begins at block 705 when a VR or AR simulation is run to build a driving history for the user 160. For example, a VR or AR feed may be provided to the user 160 via the VR goggles 162 (possibly coupled with the VR gloves 163), the smart windshield 154, etc. In some examples, such as the example of FIG. 2, the user 160 traverses streets in a VR simulation by controlling a VR vehicle through the VR gloves 163, and/or VR simulation accelerator and brake pedals.

In some examples, such as the example of FIG. 3, the VR or AR simulation is displayed on the smart windshield 154, and the user 160 traverses streets using the vehicle controls (e.g., the vehicle's steering wheel, accelerator pedal, etc.). In some implementations of this, the vehicle is still driving autonomously while the user 160 traverses the streets (e.g., the user 160 turning the steering wheel does not affect the vehicle's actual steering because the vehicle 150 is driving autonomously). In some AR implementations, such as the example of FIG. 4, the vehicle 150 is actually driving on a street 430; however, the smart windshield 154 overlays an image of a dirt road 440 onto the AR display 400 so that the user 160 views the dirt road 440 instead of the street 430.

As the user 160 traverses the streets, a driving history in any suitable form may be recorded. For instance, the driving history may comprise any or all of records of the user's 160: steering data, velocity data, acceleration data, braking data, turn signal data, cornering data, heading data, weather and/or environmental data, traffic and/or congestion data, time-of-day data, road condition data, etc. The driving history may also include records of collisions between the vehicle and any objects (e.g., other vehicles, buildings, pedestrians, etc.). The driving history may also comprise the VR or AR feed of the VR or AR simulation.

The driving history may be recorded to any suitable medium (e.g., the memory 122, the VR/AR database 118, the external database 180, electronic memory within the vehicle 150, etc.).

The VR or AR simulation may also include weather or road conditions. Examples of weather or road conditions include: driving during rain; driving during snow; driving on ice; driving during high wind; driving at night; driving during bright sunlight; driving on narrow streets; driving a truck; driving a trailer; driving with a heavy load; driving in dense traffic; driving on a dirt road; driving on a gravel road; driving on a road with sharp turns (e.g., a turn with a turn angle of less than 85°); and/or driving on steep inclines and/or declines. As will be seen, the weather or road condition(s) included in the VR or AR simulation may be used to determine categorical scores of the driving score, thereby improving adjustments that may be made to the navigation directions.

At block 710, the one or more processors obtain a driving score for a user based upon the user's driving history traversing streets displayed in VR. Obtaining the driving score may include determining the driving score based upon data of the driving history. For example, the driving score may be determined based upon steering data, velocity data, acceleration data, braking data, turn signal data, collision data for collisions between the vehicle and any objects (e.g., other vehicles, buildings, pedestrians, etc.), etc. The driving score may also be determined based upon the VR or AR feed itself (e.g., determined based upon a predetermined difficulty score associated with the VR or AR feed, determined based upon an analysis of the VR or AR feed [e.g., with a machine learning algorithm, etc.], etc.).

In some embodiments, the driving score may be determined using a machine learning algorithm. For example, the driving history may be input into a trained machine learning algorithm to determine the driving score. Furthermore, the machine learning algorithm may have been trained by any suitable technique (e.g., supervised learning, unsupervised learning, semi-supervised learning). Examples of the machine learning algorithm may include neural networks, deep learning algorithms, etc.

However, some embodiments do not use a machine learning algorithm to determine the driving score. For example, in some embodiments, the driving score is increased or decreased based upon driving criteria. For example, the driving score may be decreased if the vehicle collides with another object, and increased based upon a length of time that the vehicle is driving within the speed limit. Examples of the driving criteria include: speed data, acceleration data, collision data, braking data, cornering data, etc.

Furthermore, in some embodiments, the one or more processors 120 do not themselves determine the driving score. For example, the driving score may be determined by the one or more processors 151, and subsequently obtained by the one or more processors 120.

In addition, the driving score may include categorical scores. Examples of the categorical scores include: a score for driving during rain; a score for driving during snow; a score for driving on ice; a score for driving during high wind; a score for driving at night; a score for driving during bright sunlight; a score for driving on narrow streets; a score for driving a truck; a score for driving a trailer; a score for driving with a heavy load; a score for driving in dense traffic; a score for driving on a dirt road; a score for driving on a gravel road; a score for driving on a road with sharp turns; and/or a score for driving on steep inclines and/or declines.

At block 715, the one or more processors 120 may receive a request for navigation directions (e.g., from the user 160). The request for navigation directions may include any suitable information. Examples of information that the request for navigation directions may include are: a start location, a destination, a start time, a request to avoid highways, a request to avoid tolls, etc.

At block 720, the one or more processors 120 may obtain complexity score data, and/or other data. In some embodiments, the complexity score data, and/or other data is obtained in response to the receiving of the request for navigation directions. In some embodiments, the complexity score data obtained corresponds to potential routes and/or segments (e.g., portions) of the potential routes of the navigation directions.

The complexity score data may be used, for example, to generate complexity score(s) for a route. The complexity score data may be received from any suitable source. For example, a smart infrastructure device 170 may send complexity score data to the one or more processors 120.

In some examples of this, the complexity score data may be raw data generated by a smart infrastructure device 170. For instance, the smart infrastructure device 170 may send raw data (e.g., imagery data, such as image data, video data, LIDAR data, etc.) to the one or more processors 120, and the one or more processors 120 may analyze the received raw data (e.g., to determine a condition). For example, the one or more processors 120 may analyze the raw data to determine that it is raining on a particular road segment, and thus determine to increase the complexity score corresponding to that road segment.

In other examples, the smart infrastructure device 170 itself analyzes the raw data, and not send the raw data. For example, the smart infrastructure device 170 may analyze imagery data to determine that it is raining, and send only an indication that it is raining to the one or more processors 120 (e.g., the complexity score data received by the one or more processors 120 includes the indication that it is raining).

Examples of conditions determined (e.g., by the one or more processors 120, the smart infrastructure device 170, etc.) include: driving during rain; driving during snow; driving on ice; driving during high wind; driving at night; driving during bright sunlight; driving on narrow streets; driving a truck; driving a trailer; driving with a heavy load; driving in dense traffic; driving on a dirt road; driving on a gravel road; driving on a road with sharp turns; and/or driving on steep inclines and/or declines.

Another example of data that the complexity score data may include is data of the vehicle 150. This is because certain routes may be more difficult to traverse for particular vehicles. For example, a long vehicle (e.g., a vehicle with a length greater than a predetermined length) may have difficulty navigating sharp turns. In another example, a large vehicle may have more difficulty traversing narrow streets than a small vehicle. Thus, in some embodiments, a complexity score may be increased based upon narrow streets, and further increased based upon both the vehicle 150 being large, and the narrow street condition. In another example, a long vehicle may have difficulty navigating sharp turns.

Additionally or alternatively to receiving complexity score data at block 715, the one or more processors 120 may receive other data, such as historical driving information of the user 160 (e.g., real-world historical driving information), which may be used to modify the driving score (or may be used as part of determining the driving score if the data is received before determining the driving score). The historical driving information of the user 160 may include: steering data, velocity data, acceleration data, braking data, speed data, weather data, cornering data, congestion data, construction data, turn signal data, collision data for collisions between the vehicle and any objects (e.g., other vehicles, buildings, pedestrians, etc.), routes traversed including dates and/or times of the traversals, etc. on real-world roads. Advantageously, modifying the driving score with the historical driving information of the user 160 (or determining the driving score based upon the historical driving information of the user 160) improves the accuracy of the driving score.

However, not using the historical driving information of the user 160 has advantages as well. For example, using only the user's 160 driving history traversing streets displayed in VR allows for control of which conditions (e.g., rain, snow, narrow streets, driving on a dirt road, etc.) are considered in the determination of the driving score. For example, the VR or AR simulations may include a specific set of conditions that are useful in calculating the driving score and/or that enable calculation of category scores. A further advantage is that the routes of the VR or AR simulations may have predetermined difficulty scores associated with them, which may be used to greatly simplify the calculation of the driving score.

At block 725, the one or more processors 120 may generate complexity score(s) for potential routes and/or segments of the potential routes for the navigation directions. The complexity score(s) may be generated based upon any suitable criteria. For example, the complexity score may be based upon weather or road conditions (e.g., as determined by the one or more processors 120, the road infrastructure devices 170, etc.) of the potential routes and/or segments of the potential routes. Examples of weather or road conditions may include: driving during rain; driving during snow; driving on ice; driving during high wind; driving at night; driving during bright sunlight; driving on narrow streets; driving a truck; driving a trailer; driving with a heavy load; driving in dense traffic; driving on a dirt road; driving on a gravel road; driving on a road with sharp turns; and/or driving on steep inclines and/or declines.

The complexity score(s) may be determined by any suitable technique. For example, the complexity score may be determined by increasing or decreasing a base complexity score based upon the conditions or severity of the conditions. For instance, driving on a dirt road may increase the complexity score of a potential route and/or a segment of a potential route.

In another example, the complexity score may be increased based upon grades of inclines and/or declines in the potential route and/or segment of a potential route. In another example, the complexity score may be increased based upon a turn angle of a turn. In yet another example, the complexity score may be increased if both: (i) the length of the vehicle 150 is greater than a predetermined length, and (ii) the segment of the route includes a turn with a turn angle which is less than a predetermined threshold.

In some embodiments, the complexity score is determined using a machine learning algorithm. For example, the complexity score data may be input into a trained machine learning algorithm to determine the complexity score. Furthermore, the machine learning algorithm may have been trained by any suitable technique (e.g., supervised learning, unsupervised learning, semi-supervised learning). Examples of the machine learning algorithm may include neural networks, deep learning algorithms, etc.

The complexity score may also include categorical scores. Examples of categories may include: driving during rain; driving during snow; driving on ice; driving during high wind; driving at night; driving during bright sunlight; driving on narrow streets; driving a truck; driving a trailer; driving with a heavy load; driving in dense traffic; driving on a dirt road; driving on a gravel road; driving on a road with sharp turns; and/or driving on steep inclines and/or declines.

The categorical scores may also be determined by any suitable technique. For example, the categorical scores may be determined based upon the analysis of the complexity score data. In another example, the categorical scores may be determined by inputting the complexity data into a trained machine learning algorithm. The machine learning algorithm may have been trained by any suitable technique (e.g., supervised learning, unsupervised learning, semi-supervised learning). Examples of the machine learning algorithm may include neural networks, deep learning algorithms, etc.

At block 730, the one or more processors 120 may generate a set of navigation directions including adjusting the navigation directions based upon the driving score for the user. The set of navigation directions may be based upon any of the information in the received request for navigation (e.g., received at block 715).

In some examples, the adjustment to the set of navigation directions is based upon a comparison between the driving score and the complexity score for portion(s) of the route. For example, if the comparison indicates that the portion(s) of the route would be difficult for the user 160 to navigate (e.g., the complexity score exceeds the driving score, the complexity score exceeds the driving score by a threshold amount, the complexity score exceeds a threshold complexity score where the threshold is determined based upon the driving score, etc.), the one or more processors adjusts the set of navigation directions accordingly.

Additionally or alternatively, the adjustment to the set of navigation directions may also be based upon the categorical scores of the driving score, and/or the categorical scores of the complexity score. For example, a categorical score of the driving score may be compared to the corresponding categorical score of the complexity score. For instance, a categorical score of the driving score for driving during rain may be compared to a categorical score of the complexity score for driving during rain. The adjustment to the set of navigation directions may be based upon the comparison.

One example of adjusting the set of navigation directions may include changing a route of the set of navigation directions. For instance, as in the example of FIG. 5, an original portion 550 of the route 520 may be replaced by a detour portion 560 of the route 520. In some examples, the original portion 550 of the route has a higher complexity score than the detour portion 560 of the route.

More specifically, the one or more processors 120 may select a route for navigating from the starting location to the destination location using a pathfinding algorithm, where each road segment is assigned a weight based upon the complexity score and/or an estimated time period for traversing the road segment. In some implementations, the one or more processors 120 may traverse each path or candidate route from the starting location to the destination location using the road segments in the geographic area and their corresponding weights to identify a path or route having the lowest combined weight.

In other implementations, the one or more processors 120 may traverse each path or candidate route from the starting location to the destination location using the road segments in the geographic area and their corresponding weights to identify a threshold number of paths or routes (e.g., five) having the lowest combined weights for presenting the identified routes in a ranked order according to the combined weights. In yet other implementations, the one or more processors 120 may obtain a set of candidate routes from a navigation server. The one or more processors 120 may then traverse each candidate route from the starting location to the destination location using the road segments on the candidate route and their corresponding weights to identify a route of the set of candidate routes having the lowest combined weight.

In other implementations, this process may be performed for selecting the detour portion 560 of the route 520. For example, the one or more processors 120 may select the detour portion 560 of the route 520 for navigating from a detour starting location to a detour destination location using a pathfinding algorithm, where each road segment is assigned a weight based upon the complexity score and/or an estimated time period for traversing the road segment. The one or more processors 120 may traverse each path or candidate route from the detour starting location to the detour destination location using the road segments in the geographic area and their corresponding weights to identify a path or route having the lowest combined weight and/or to identify a path or route with road segments having complexity scores below a threshold complexity score which may be based upon the driving score, below the driving score, and/or below a combination of the complexity score and the driving score.

Another example of adjusting the set of navigation directions includes sending a warning to the user (e.g., a warning that it may be dangerous for the user to drive on a certain segment of a route based upon the user's skill level). For instance, as in the example of FIG. 6, a segment 650 of the route 620 has a warning 660 that says "Warning: It is recommended that you avoid this segment of the route based on your driving score. Would you like to reroute to avoid this segment?" As this example illustrates, the warning may also include a question to the user asking if the user 160 would like to reroute to avoid a particular segment.

If the user 160 responds in the affirmative, the navigation directions will be adjusted to avoid the particular segment. In some embodiments, the user 160 may respond by typing input into a smartphone or GPS device. Additionally or alternatively, the user 160 may make an audio response (e.g., say "yes, please reroute"). Advantageously, an audio response allows a user 160 to better continue to focus on driving while making the response.

However, it may be noted that the user 160 may opt in to a program where the original portion 550 of the route is replaced with the detour portion 560, so that no warning (as in the example of FIG. 6) is necessary.

At block 735, the one or more processors 120 provides the adjusted set of navigation directions to the user 160. For example, the user 160 may view the navigation directions on a smartphone 165, the smart windshield 154, a GPS device, etc. The method 700 may include additional, less, or alternate actions, including those discussed elsewhere herein.

Applicability to the Insurance Industry

Some embodiments have particular applicability to the insurance industry. For example, discounts to insurance premiums may be provided by the techniques described herein. For instance, if a driver 160 agrees to reroute (e.g., as by responding to the warning 660 of FIG. 6), the driver 160 may receive a discount on an insurance premium.

In another example, a user 160 may receive a discount on an insurance premium for agreeing to opt into a program where the warnings are provided (e.g., as in the example of FIG. 6).

In yet another example, the user 160 may receive a discount on an insurance premium for agreeing to opt into a program that automatically reroutes the route (e.g., as part of the adjustment to the set of navigation directions) based upon the user's 160 driving score and/or the complexity score.

In one aspect, data from the vehicle 150, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to autonomous vehicles.

Exemplary Improved Vehicle Navigation Based Upon Virtual Reality (VR) or Augmented Reality (AR) Training In one aspect, a computer-implemented method for improved vehicle navigation based upon virtual reality (VR) or augmented reality (AR) training may be provided. The method may include: (1) obtaining, via one or more processors, a driving score for a user based upon the user's driving history traversing streets displayed in VR; (2) receiving, by the one or more processors, a request for navigation directions to a destination; (3) generating, by the one or more processors, a set of navigation directions in response to the request, including adjusting the set of navigation directions based upon the driving score for the user; and/or (4) providing, by the one or more processors, the adjusted set of navigation directions to the user. The method may include additional, fewer, or alternate actions, including those discussed elsewhere herein.

For instance, adjusting the set of navigation directions may comprise changing a route, or sending a warning to the user. In some embodiments, adjusting the set of navigation directions may comprise replacing an original portion of a route with a detour portion of the route; and/or the detour portion of the route may have a complexity score which is less than a complexity score of the original portion of the route. Additionally or alternatively, the adjusted set of navigation directions may include a warning that it may be dangerous for the user to drive on a certain segment of a route based upon the user's skill level.

In some embodiments, the method may further include (i) generating, via the one or more processors, a complexity score for a segment of a route of the navigation directions; and/or (ii) adjusting the set of navigation directions may be further based upon the complexity score. In certain embodiments, the complexity score may be based upon a turn angle in the segment of the route.

In some embodiments, the method may further include (a) receiving, via the one or more processors, a length of a vehicle of the user; and/or (b) increasing, via the one or more processors, the complexity score of the segment of the route in response to determining that: (i) the length of the vehicle is greater than a predetermined length, and (ii) the segment of the route includes a turn with a turn angle which is less than a predetermined threshold.

In some embodiments, the driving score may comprise category scores, with the category scores comprising: a score for driving during rain; a score for driving during snow; a score for driving on ice; a score for driving during high wind; a score for driving at night; a score for driving during bright sunlight; a score for driving on narrow streets; a score for driving a truck; a score for driving a trailer; a score for driving with a heavy load; a score for driving in dense traffic; a score for driving on a dirt road; a score for driving on a gravel road; and/or a score for driving on steep inclines and/or declines.

In some embodiments, the driving score may be calculated further based upon historical driving information of the user. In certain embodiments, the driving score is not calculated based upon historical driving information of the user.

In another aspect, a computer system configured for improved vehicle navigation based upon virtual reality (VR) or augmented reality (AR) training may be provided. The computer system may comprise one or more local or remote processors, transceivers, and/or sensors configured to: (1) obtain a driving score for a user based upon the user's driving history traversing streets displayed in VR; (2) receive a request for navigation directions to a destination; (3) generate a set of navigation directions in response to the request, including adjusting the set of navigation directions based upon the driving score for the user; and/or (4) provide the adjusted set of navigation directions to the user. The computer system may include additional, less, or alternate functionality, including that discussed elsewhere herein.

For instance, adjusting the set of navigation directions may include changing a route, or sending a warning to the user. In some embodiments, adjusting the set of navigation directions may include replacing an original portion of a route with a detour portion of the route; and/or the detour portion of the route may have a complexity score which is less than a complexity score of the original portion of the route. Additionally or alternatively, the adjusted set of navigation directions may include a warning that it may be dangerous for the user to drive on a certain segment of a route based upon the user's skill level.

In some embodiments, the one or more local or remote processors, transceivers, and/or sensors may be further configured to generate a complexity score for a segment of a route of the navigation directions. In certain embodiments, adjusting of the set of navigation directions may be further based upon the complexity score.

In some embodiments, the complexity score may be based upon a turn angle in the segment of the route.

In yet another aspect, a computer device for improved vehicle navigation based upon virtual reality (VR) or augmented reality (AR) training may be provided. The computer device may include: one or more processors; and one or more memories coupled to the one or more processors. The one or more memories may include computer executable instructions stored therein that, when executed by the one or more processors, may cause the one or more processors to: (1) obtain a driving score for a user based upon the user's driving history traversing streets displayed in VR; (2) receive a request for navigation directions to a destination; (3) generate a set of navigation directions in response to the request, including adjusting the set of navigation directions based upon the driving score for the user; and/or (4) provide the adjusted set of navigation directions to the user. The computer device may include additional, less, or alternate functionality, including that discussed elsewhere herein.

For instance, adjusting the set of navigation directions may comprise changing a route, or sending a warning to the user. In some embodiments, the adjusted set of navigation directions may include a warning that it may be dangerous for the user to drive on a certain segment of a route based upon the vehicle operator's skill level.

In some embodiments, the one or more memories including computer executable instructions stored therein that, when executed by the one or more processors, may further cause the one or more processors to: generate a complexity score for a segment of a route of the navigation directions; and/or adjusting of the set of navigation directions may further be based upon the complexity score.

OTHER MATTERS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules.

In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for generating a set of navigation directions based upon virtual reality (VR) or augmented reality (AR) training, the computer-implemented method comprising:

obtaining, via one or more processors, a driving score of a user, wherein the driving score is based upon a driving history of the user including traversing streets displayed in VR;

receiving, by the one or more processors, a request for navigation directions to a destination;

generating, by the one or more processors, the set of navigation directions in response to the request, including adjusting the set of navigation directions based upon the driving score of the user by including at least one turn from a first street onto a second street, wherein the second street corresponds to a route with a lower complexity score than a complexity score corresponding to the first route; and providing, by the one or more processors, the adjusted set of navigation directions to the user.

2. The computer-implemented method of claim 1, wherein:

adjusting the set of navigation directions comprises replacing an original portion of a route with a detour portion of the route; and the detour portion of the route has a complexity score which is less than a complexity score of the original portion of the route.

3. The computer-implemented method of claim 1, wherein the adjusted set of navigation directions includes a warning that it may be dangerous for the user to drive on a certain segment of a route based upon the driving score of the user.

4. The computer-implemented method of claim 1, further comprising:

generating, via the one or more processors, the complexity score corresponding to the first route; and wherein adjusting of the set of navigation directions is further based upon the complexity score corresponding to the first route.

5. The computer-implemented method of claim 4, wherein the complexity score corresponding to the first route is based upon a turn angle in the first route.

6. The computer-implemented method of claim 4, further comprising:

receiving, via the one or more processors, a length of a vehicle of the user; and increasing, via the one or more processors, the complexity score corresponding to the first route in response to determining that: (i) the length of the vehicle is greater than a predetermined length, and (ii) the first route includes a turn with a turn angle which is less than a predetermined threshold.

7. The computer-implemented method of claim 1, wherein the driving score comprises categorical scores, the categorical scores comprising:

a score of driving during rain;
a score of driving during snow;
a score of driving on ice;
a score of driving during high wind;
a score of driving at night;
a score of driving during bright sunlight;
a score of driving on narrow streets;
a score of driving a truck;
a score of driving a trailer;
a score of driving with a heavy load;
a score of driving in dense traffic;
a score of driving on a dirt road;
a score of driving on a gravel road; and/or
a score of driving on steep inclines and/or declines.

8. The computer-implemented method of claim 1, wherein the driving score is further based upon historical driving information of the user.

9. The computer-implemented method of claim 1, wherein the driving score is not based upon historical driving information of the user.

10. A computer system configured for generating a set of navigation directions based upon virtual reality (VR) or augmented reality (AR) training, the computer system comprising one or more local or remote processors, transceivers, and/or sensors configured to:

obtain a driving score of a user, wherein the driving score is based upon a driving history of the user including traversing streets displayed in VR;

receive a request for navigation directions to a destination;

generate the set of navigation directions in response to the request, including adjusting the set of navigation directions based upon the driving score of the user by including at least one turn from a first street onto a second street, wherein the second street corresponds to a route with a lower complexity score than a complexity score corresponding to the first route; and provide the adjusted set of navigation directions to the user.

11. The computer system of claim 10, wherein adjusting the set of navigation directions comprises changing a route, or sending a warning to the user.

12. The computer system of claim 10, wherein:

adjusting the set of navigation directions comprises replacing an original portion of a route with a detour portion of the route; and the detour portion of the route has a complexity score which is less than a complexity score of the original portion of the route.

13. The computer system of claim 10, wherein the adjusted set of navigation directions includes a warning that it may be dangerous for the user to drive on a certain segment of a route based upon the driving score of the user.

14. The computer system of claim 10, wherein the one or more local or remote processors, transceivers, and/or sensors are further configured to:

generate the complexity score corresponding to the first route; and wherein adjusting of the set of navigation directions is further based upon the complexity score corresponding to the first route.

15. The computer system of claim 14, wherein the complexity score corresponding to the first route is based upon a turn angle in the first route.

16. A computer device for generating a set of navigation directions based upon virtual reality (VR) or augmented reality (AR) training, the computer device comprising:

one or more processors; and one or more memories coupled to the one or more processors;

the one or more memories including computer-executable instructions stored therein that, when executed by the one or more processors, cause the one or more processors to:

obtain a driving score of a user, wherein the driving score is based upon a driving history of the user including traversing streets displayed in VR;

receive a request for navigation directions to a destination;

generate the set of navigation directions in response to the request, including adjusting the set of navigation directions based upon the driving score of the user by including at least one turn from a first street onto a second street, wherein the second street corresponds to a route with a lower complexity score than a complexity score corresponding to the first route; and provide the adjusted set of navigation directions to the user.

17. The computer device of claim 16, wherein adjusting the set of navigation directions comprises changing a route, or sending a warning to the user.

18. The computer device of claim 16, wherein the adjusted set of navigation directions includes a warning that it may be dangerous for the user to drive on a certain segment of a route based upon the driving score of the user.

19. The computer device of claim 16, wherein the one or more memories including computer-executable instructions stored therein that, when executed by the one or more processors, further cause the one or more processors to:

generate the complexity score corresponding to the first route; and wherein adjusting of the set of navigation directions is further based upon the complexity score corresponding to the first route.

20. The computer device of claim 19, wherein the one or more memories including computer-executable instructions stored therein that, when executed by the one or more processors, further cause the one or more processors to generate the set of navigation directions in response to the request, including adjusting the set of navigation directions further by:

selecting a route navigating from a starting location to the destination using a pathfinding algorithm, wherein a road segment is assigned a weight based upon the complexity score of the road segment and an estimated time period for traversing the road segment.

* * * * *